Oct. 4, 1938.  E. R. BERGMANN  2,131,867
SHAKER CONVEYER
Filed Nov. 20, 1937
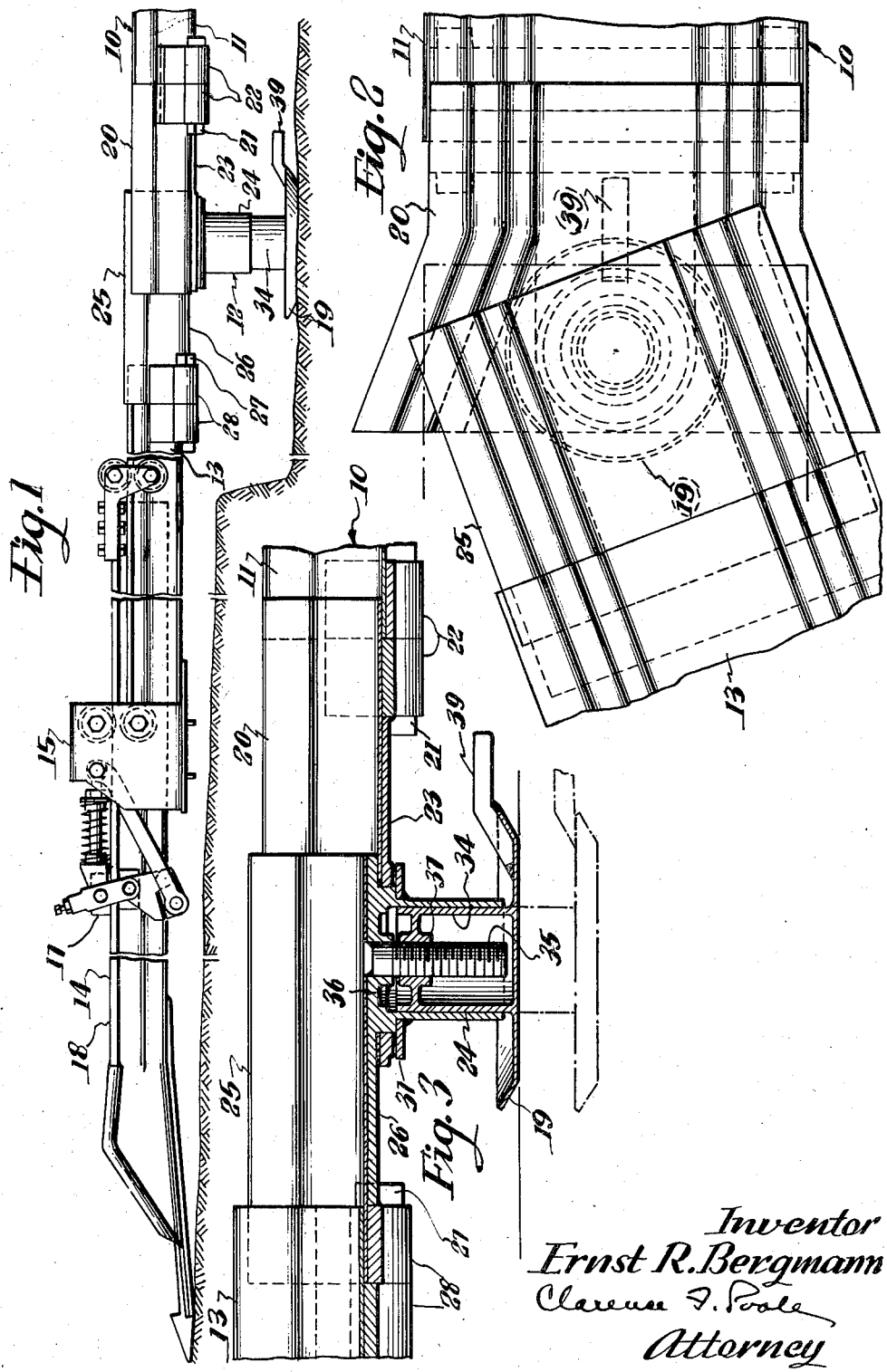
Inventor
Ernst R. Bergmann
Clarence T. Poole
Attorney Patented Oct. 4, 1938

2,131,867

UNITED STATES PATENT OFFICE 2,131,867

SHAKER CONVEYER

Ernst R. Bergmann, Chicago, Ill., assignor to Goodman Manufacturing Company, Chicago, Ill., a corporation of Illinois Application November 20, 1937, Serial No. 175,555

9 Claims. (Cl. 198—220)

This invention relates to improvements in shaker conveyers and has among other objects to provide a novel form of swivel connection in a shaker conveyer trough line of the type used in mines underground, which is so arranged as to permit swiveling movement of one section of the trough line with respect to the other, and which forms a means for vertically adjusting adjacent ends of the trough sections connected thereto to permit one trough section to extend to and along upwardly inclined surfaces or ledges disposed above the ground or mine bottom proper at substantially the same inclination with respect to the ground as the remainder of the trough line.

Another object of my invention is to provide a simplified form of swivel for a shaker conveyer trough line of a novel construction which is so arranged that rotation of a supporting shoe for the swivel will cause vertical movement of the connecting trough sections which are connected thereto.

My invention may be more clearly understood with reference to the accompanying drawing wherein:

Figure 1 is a side elevation of a conveyer trough line showing a driven trough section having a pick-up member extensible from the forward end thereof resting on a ledge spaced above the surface upon which the remainder of the trough line is supported and showing a swivel constructed in accordance with my invention in the trough line;

Figure 2 is an enlarged fragmentary plan view of the trough line showing the swivel, with the parts in a different position than in Figure 1; and Figure 3 is a substantially longitudinal sectional view taken through the connecting troughs and swivel.

Referring now in particular to the drawing, the embodiment of my invention illustrated therein is shown as being connected in a shaker conveyer trough or pan line 10 of a type used underground in mines. Said trough line is driven from a suitable reciprocatory drive mechanism (not shown) in a usual manner well known to those skilled in the art.

The pan line 10 includes a driving trough section 11, a swivel generally indicated by reference character 12 having connection with the forward end thereof and supporting the forward end of said trough section above the ground, and a driven trough section 13 secured to the opposite end of said swivel and extending forwardly therefrom.

The driven trough section 13, as herein shown, has an extensible trough section 14 nested therein and adapted to be extended or retracted with respect thereto to enable said extensible trough section to pick up loose material from the ground. Extension or retraction of said extensible trough section is effected by means of a feeding head generally indicated by reference character 15 which includes a pair of friction gripping devices 17, 17 adapted to be engaged with plates 18, 18, extending laterally from the upper sides of said extensible trough section, during either the forward or return stroke of the conveyer, and is of an ordinary construction so will not herein be described in detail.

With reference now in particular to the details of the swivel 12 and several of the novel features of my invention, said swivel includes a shoe 19 which is adapted to rest on and slide along the ground and form a pivotal support for relatively short connecting trough sections 20 and 25. The trough section 20 is detachably connected to the forward end of the driving trough 11 by means of a pair of connecting bolts 21, 21 which extend through eye pieces 22, 22 projecting laterally from said trough sections adjacent the lower ends thereof.

The connecting trough section 20 has a flared forward end to receive material from the trough section 25 when in various positions of adjustment with respect thereto and is provided with a reinforcing bottom plate 23. The bottom of the forward end of said trough section and said reinforcing plate have a circular aperture formed therein which is adapted to receive an upper enlarged portion of a cylindrical frame 24. Said frame is of a hollow cylindrical formation and depends from the connecting trough section 25. The plate 23 and trough section 20 are mounted on said cylindrical frame directly beneath the connecting trough section 25 so said trough section may discharge directly into the connecting trough section 20. The connecting trough section 20 is restrained from downward movement with respect to the trough section 25 by means of an annular ring 31 abutting the underside of the plate 23 and secured to the underside of a shouldered portion of said cylindrical frame in a suitable manner such as welding.

The cylindrical frame 24 is secured to the underside of the connecting trough section 25 and, as herein shown, has an integrally formed reinforcing plate 26 extending therefrom along the underside of said connecting trough section and secured thereto. Said connecting trough section is secured at its forward end to the driven trough section 13 by means of connecting bolts 27, 27 extending through aligned eye pieces 28, 28 in adjacent ends of said trough sections.

The shoe 19, as herein shown, is circular in form having an upturned periphery to permit ease in sliding movement along the ground, and has an upwardly extending hollow cylindrical central portion 34. Said hollow cylindrical portion is adapted to be engaged by the inner periphery of the depending walls of the hollow cylindrical frame 24, thus forming a pivotal and slidable connection between said frame and said upwardly extending central portion of said shoe.

The means for vertically adjusting the frame 24 with respect to the shoe 19 includes a threaded shaft 35 secured at its upper end to a boss 36 disposed centrally of the cylindrical wall portion of said frame. The depending end of said threaded shaft is threaded within a threaded member 37 disposed centrally of the cylindrical portion 34, and herein shown as being formed integral therewith. A handle 39 is secured to the shoe 19 and projects outwardly therefrom. This handle is adapted to receive the end of a pipe (not shown) or any other means for obtaining a mechanical advantage for turning said shoe and thus elevating the frame 24 and the connecting trough sections 20 and 25 with respect to the ground in an obvious manner.

It will be seen from the foregoing that a simple form of swivel has been provided for connecting two portions of a shaker conveyer trough line together and permitting one to swivel with respect to the other in a horizontal plane, which swivel is so arranged as to afford vertical adjustment of adjacent ends of these sections of the pan line and thus permit one trough section to be disposed along a ledge above the mine bottom and gather mined material therefrom. It will also be seen that the means for affording vertical adjustment of the trough sections is of a simple and compact form so arranged that rotation of the supporting shoe for the swivel causes vertical movement of the trough sections with respect thereto.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. In a swivel for shaker conveyer trough lines, a supporting shoe adapted to rest on the ground, a connecting trough section mounted on said shoe for pivotal movement with respect thereto about a vertical axis, another connecting trough section mounted for movement with respect to said first trough section about a vertical axis, said shoe having an upwardly extending cylindrical portion, a hollow cylindrical frame extending downwardly from one of said trough sections and adapted to have pivotal and slidable engagement with said cylindrical portion, a supporting connection between said frame and trough sections, and an interengaging elevating connection between said frame and cylindrical portion for elevating said frame and trough sections with respect to said shoe upon rotation of said shoe.

2. In a swivel for shaker conveyer trough lines, a supporting shoe adapted to rest on the ground, a connecting trough section mounted on said shoe for pivotal movement with respect thereto about a vertical axis, another connecting trough section mounted for movement with respect to said first trough section about a coaxial vertical axis, said shoe having a hollow upwardly extending cylindrical portion, a hollow cylindrical frame extending downwardly from one of said trough sections adapted to have pivotal engagement with said cylindrical portion, a supporting connection between said frame and trough section, means for rotatably moving said shoe, and an interengaging elevating connection disposed within said frame and cylindrical portion for elevating said frame and trough sections with respect to said shoe upon rotation of said shoe.

3. In a swivel for shaker conveyer trough lines, a supporting shoe adapted to rest on the ground, a connecting trough section mounted on said shoe for pivotal movement with respect thereto about a vertical axis, another connecting trough section mounted for movement with respect to said first mentioned trough section about a coaxial vertical axis, said shoe having a hollow upwardly extending cylindrical portion, a hollow cylindrical frame extending downwardly from one of said trough sections and adapted to have pivotal and slidable engagement with said cylindrical portion, and an elevating connection between said frame and cylindrical portion for elevating said frame and trough sections with respect to said shoe upon rotation of said shoe including a threaded shaft disposed centrally of said frame, and an internally threaded member disposed within said cylindrical portion and having threaded engagement with said shaft.

4. In a swivel for shaker conveyer trough lines, a supporting shoe adapted to rest on the ground, a connecting trough section, and a vertically adjustable supporting connection between said trough section and said shoe including a cylindrical frame member depending from said trough section and having pivotal and slidable engagement with an upwardly extending cylindrical portion of said shoe, and means for elevating said cylindrical frame member with respect to said shoe upon rotation thereof including a threaded shaft mounted within said frame member and having threaded engagement with an internally threaded member disposed within said cylindrical portion.

5. In a swivel for shaker conveyer trough lines, a supporting shoe adapted to rest on the ground, a connecting trough section, a vertically adjustable supporting connection between said trough section and said shoe including a cylindrical frame member depending from said trough section and having pivotal and slidable engagement with an upwardly extending cylindrical portion of said shoe, means for elevating said cylindrical frame member with respect to said shoe upon rotation thereof including a threaded shaft mounted within said cylindrical frame member and having threaded engagement with an internally threaded member disposed within said cylindrical portion, and another connecting trough section, said trough section having a flared receiving end and being mounted beneath said first mentioned trough section on the outer periphery of said frame member for vertical movement therewith and for pivotal movement with respect thereto about a vertical axis coaxial with the center thereof.

6. A vertically adjustable supporting swivel for shaker conveyer trough lines including a supporting shoe adapted to rest on and slide along the ground and having an upwardly extending hollow cylindrical portion, a connecting trough section, a hollow cylindrical frame depending from said trough section and adapted to have slidable and pivotal engagement with said upwardly extending hollow cylindrical portion, another trough section having a flared receiving end, said trough section being mounted on said frame beneath said first mentioned trough section for pivotal movement with respect thereto about an axis coaxial with the center thereof, an adjustable connection between said shoe and frame for vertically moving said frame upon rotation of said shoe including a threaded shaft mounted within said frame and secured thereto, an internally threaded member mounted within said cylindrical portion and having threaded engagement with said shaft, and means projecting from said shoe to permit said shoe to be rotated to cause said frame and trough sections to move vertically with respect thereto.

7. In a shaker conveyer trough line, a driving trough section, a driven trough section, and a swiveled connection between adjacent ends of said trough sections adapted to form a means for slidably supporting said trough sections for movement along the ground and for vertically adjusting said trough sections with respect to the ground to permit said driven trough section to extend along a ledge spaced above the mine bottom proper, said swiveled connection including a supporting shoe adapted to rest on the ground and having an upwardly extending hollow cylindrical portion, a connecting trough section adapted to be secured to said driven trough section, a frame having cylindrical walls depending therefrom and forming a support for said trough section, another connecting trough section supported beneath said first mentioned connecting trough section on said cylindrical walls for pivotal movement with respect thereto and being adapted to be connected to said driving trough section, said depending cylindrical walls having slidable and pivotal engagement with the outer periphery of said cylindrical portion, and interengaging means disposed within said cylindrical portion and depending cylindrical walls for elevating said frame and trough sections with respect to said shoe upon rotation of said shoe.

8. In a shaker conveyer trough line, a driving trough section, a driven trough section, and a swiveled connection between adjacent ends of said trough sections adapted to form a means for slidably supporting said trough sections for movement along the ground and for vertically adjusting said trough sections with respect to the ground to permit said driven trough section to extend along a ledge spaced above the mine bottom proper, said swiveled connection including a supporting shoe adapted to rest on the ground and having an upwardly extending hollow cylindrical portion, a connecting trough section adapted to be secured to said driven trough section, a frame having cylindrical walls depending therefrom and forming a support for said trough section, another connecting trough section supported beneath said first mentioned connecting trough section on said cylindrical walls for pivotal movement with respect thereto and being adapted to have connection with said driving trough section, said depending cylindrical walls having slidable and pivotal engagement with the outer periphery of said cylindrical portion, and interengaging means disposed within said cylindrical portion and walls for elevating said frame and trough sections with respect to said shoe upon rotation of said shoe including a threaded shaft and an internally threaded member having threaded engagement with said shaft, each of said threaded members being secured to one of said hollow members.

9. In a shaker conveyer trough line, a driving trough section, a driven trough section, and a swiveled connection between adjacent ends of said trough sections adapted to form a means for slidably supporting said trough sections for movement along the ground and for vertically adjusting said trough sections with respect to the ground to permit said driven trough section to be disposed along ledges spaced above the mine bottom proper, said swiveled connection including a supporting shoe adapted to rest on the ground and having an upwardly extending hollow cylindrical portion, a connecting trough section adapted to be secured to said driven trough section, a frame having cylindrical walls depending therefrom and forming a support for said trough section, another connecting trough section supported on said walls beneath said first mentioned connecting trough section for pivotal movement with respect thereto and being adapted to have connection with said driving trough section, said depending cylindrical walls having slidable and pivotal engagement with the outer periphery of said cylindrical portion, and interengaging means disposed within said cylindrical portion and walls for elevating said frame and trough sections with respect to said shoe upon rotation of said shoe including a threaded shaft secured to and depending from said frame centrally of said cylindrical walls, and an internally threaded member having threaded engagement with said shaft and disposed centrally of and being secured to the inner side of said hollow cylindrical portion.

ERNST R. BERGMANN.